United States Patent [19]
Yang et al.

[11] Patent Number: 6,055,351
[45] Date of Patent: Apr. 25, 2000

[54] OPTICAL FIBER CABLE

[75] Inventors: Michael Yang, NE Conover, N.C.; Jean-Pierre Bonicel, Rueil Malmaison, France; Pierre Gaillard; Olivier Tatat, both of NE Hickory, N.C.; Christopher McNutt, Hickory, N.C.

[73] Assignee: Alcatel, Paris, France

[21] Appl. No.: 09/094,555

[22] Filed: Jun. 15, 1998

[30] Foreign Application Priority Data

May 16, 1997 [FR] France ................................ 97 07425

[51] Int. Cl.⁷ .................................................. G02B 6/44
[52] U.S. Cl. ........................ 385/113; 385/109; 385/100
[58] Field of Search ............................. 385/113, 100–114

[56] References Cited

U.S. PATENT DOCUMENTS 4,688,888  8/1987  Kimmich ................................ 385/113
5,509,097  4/1996  Tondi-Resta et al. ................... 385/113

FOREIGN PATENT DOCUMENTS

2723645A1   2/1996   France .
3815565A1  11/1989   Germany .
WO9611419   4/1996   WIPO .
WO9732710   9/1997   WIPO .

*Primary Examiner*—Phan T. H. Palmer
*Attorney, Agent, or Firm*—Sughrue, Mion, Zinn, Macpeak & Seas, PLLC

[57] ABSTRACT

An optical fiber cable constituted by a single tube defining an internal bore housing at least one optical fiber and whose wall incorporates a reinforcement zone. The reinforcement zone is constituted by a thermoplastic material giving the cable both flexibility and resistance against compression and impact.

11 Claims, 2 Drawing Sheets

OPTICAL FIBER CABLE

The invention relates to an optical fiber cable constituted by a single tube defining an internal bore housing at least one optical fiber, and having a wall that incorporates a reinforcement zone.

BACKGROUND OF THE INVENTION

Such a cable structure is particularly advantageous since it makes it possible to avoid the use of a reinforcement zone surrounding the tube and the use of an external protective sheath surrounding or incorporating said reinforcement zone as is known in cables of conventional structure, thus making it possible, for given fiber capacity, to obtain a cable of smaller diameter and lighter weight than cables of conventional structure.

In addition, this structure provides easier access to the optical fibers or optical fiber ribbons received inside the tube, in particular for the purpose of making splices.

OBJECT AND SUMMARY OF THE INVENTION

The object of the invention is to provide an optical fiber cable constituted by a single tube which defines an internal bore housing at least one optical fiber and a reinforcement zone constituted by a material which gives the cable both flexibility and the ability to withstand compression and impact, and which is simple to implement during manufacture of the cable.

To this end, the invention provides an optical fiber cable constituted by a single tube defining an internal bore housing at least one optical fiber and whose wall incorporates a reinforcement zone, wherein the reinforcement zone is constituted by a thermoplastic material giving the cable both flexibility and resistance against compression and impact.

The thermoplastic material achieves a compromise between cable flexibility and its ability to withstand compression and impact. In addition, the material of the reinforcement zone is put into place by heating and then cooling to soften and then harden the material which is already polymerized.

Advantageously, the tube is constituted by a thermoplastic material as is the reinforcement zone. The cable of the invention is manufactured in a single stage, e.g. by co-extrusion, thereby simplifying manufacture, and also increasing the speed of the manufacturing line and reducing the cost of production.

BRIEF DESCRIPTION OF THE DRAWINGS

Other characteristics and advantages of the invention appear on reading the following description of two embodiments of the invention as illustrated by the drawings.

MORE DETAILED DESCRIPTION

The cable of the invention is used in particular in the field of telecommunications. It is constituted by a single tube which defines an internal bore housing at least one optical fiber. The tube and the internal bore typically have respective diameters of 12.5 mm to 13 mm and 4.6 mm to 4.7 mm.

The tube is made, for example, of low, medium, or high density polyethylene (LDPE, LLDPE, MDPE, or HDPE), and more generally of a thermoplastic material. The material preferably has a bending modulus that is greater than 850 MPa.

The polyethylene or other thermoplastic material selected for constituting the tube is filled, e.g. with carbon black in powder form, so as to give the cable increased resistance to heat and to aging. Other additives such as anti-oxidants can also be added.

The internal bore is defined by the wall of the tube and preferably contains a filling, e.g. a gel, for the purpose of protecting the optical fibers housed therein.

The cable of the invention also comprises a continuous or discontinuous reinforcement zone disposed around the internal bore of the tube in the wall thickness thereof. The reinforcement zone is constituted, for example, by a polyamide (PA) or a polybutylene terephthalate (PBT), and more generally a thermoplastic material. This material preferably has a bending modulus greater than 1000 MPa.

Preferably, the material constituting the reinforcement zone is filled, e.g. with glass fibers, constituting not more than 40% by weight thereof. Other fillers may also be suitable, for example glass beads or talc or mica, calcium carbonate, or a combination of such elements.

Similarly, to give the cable increased traction strength, the reinforcing elements are disposed parallel to a generator line of the cable. Aramid or polyester yarns, and single or braided glass fibers constitute examples of such reinforcing elements.

Figure 1:
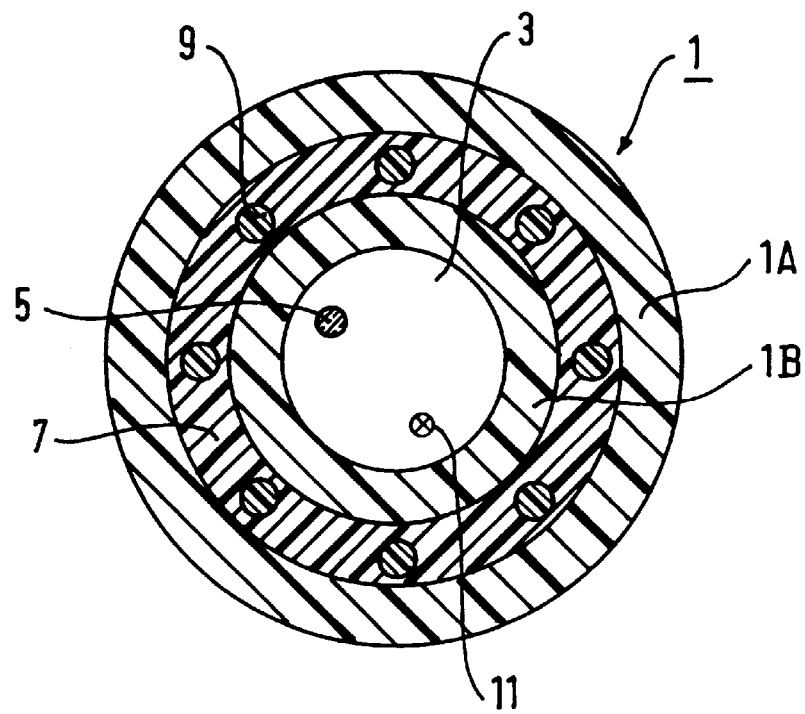
FIG. 1 is a cross-section through a first embodiment of a cable of the invention, with a continuous annular reinforcement zone.

In a first particular embodiment of the invention, the cable is constituted, as shown in FIG. 1 by a single tube 1 defining an internal bore 3 housing at least one optical fiber 5, and having a wall which incorporates, around the internal bore 3, a reinforcement zone 7 which, in a cross-section plane, has a section in the form of a continuous annulus. Reinforcing elements 9 are disposed in a regularly spaced-apart configuration in the reinforcement zone 7.

The reinforcement zone 7 is preferably helically oriented in a direction parallel to a generator line 11 of the tube 1 so as to give increased strength and flexibility to the cable.

In the example of FIG. 1, the continuous annular reinforcement zone 7 is incorporated in the thickness of the wall of the tube 1, such that said wall comprises two layers 1A and 1B of the same material constituting the tube 1 separated by the reinforcement zone 7; it is also possible for the two layers 1A and 1B to be made of two different materials.

Figure 2:
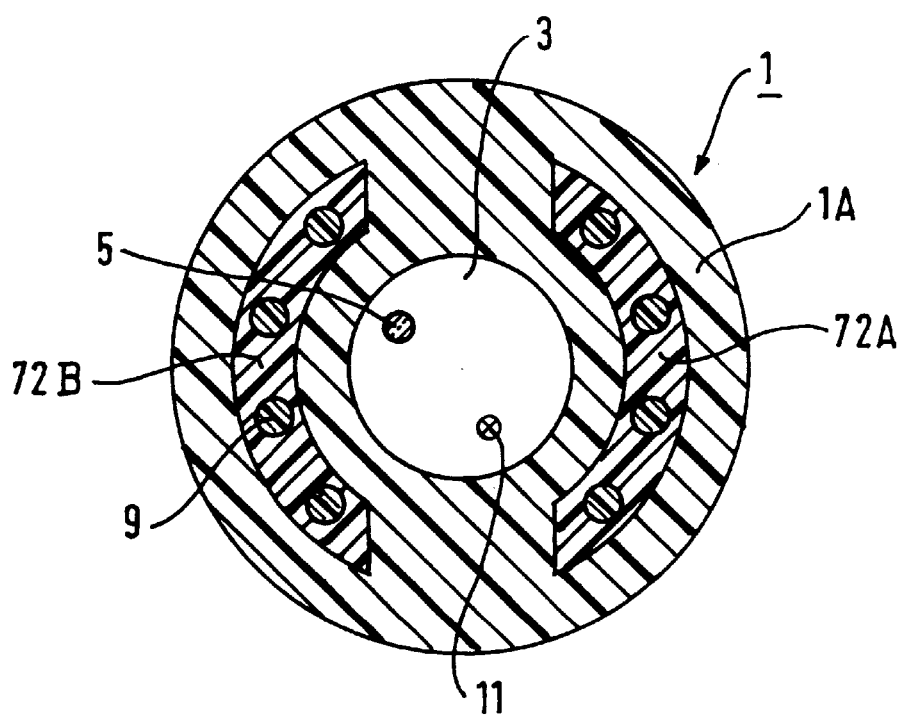
FIG. 2 is a cross-section of a first variant of a second embodiment of the cable of the invention in which the reinforcement zone comprises two sectors in the form of a substantially annular half-cylinders.
Figure 3:
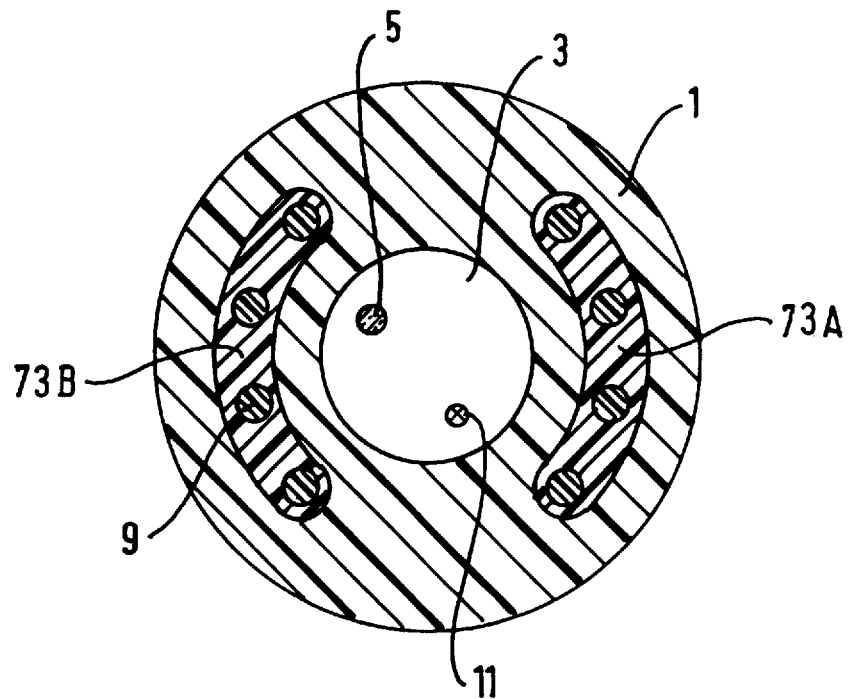
FIG. 3 is a cross-section through a second variant of the second embodiment of the cable of the invention, in which the reinforcement zone is made up of two sectors in the form of substantially elliptical half-cylinders.
Figure 4:
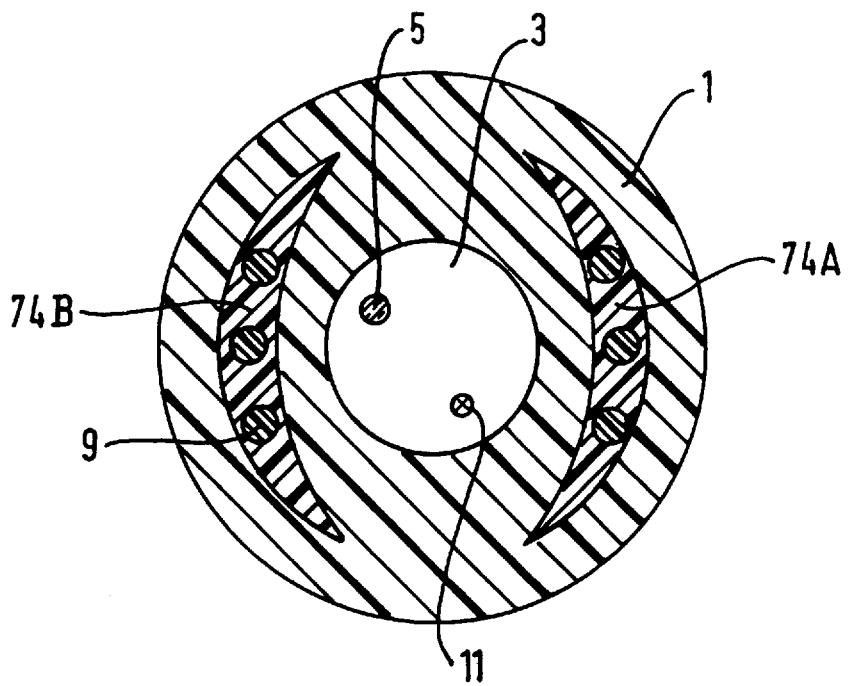
FIG. 4 is a cross-section through a third variant of the second embodiment of the cable of the invention in which the reinforcement zone comprises two sectors in the form of two substantially crescent-shaped half-cylinders.

In a second particular embodiment of the invention, three variants of which are shown in FIGS. 2, 3, and 4 respectively, a cable of the invention has a reinforcement zone which, in a cross-section plane, presents at least two disjoint sectors disposed on either side of the internal bore of the tube, preferably symmetrically about the bore.

The reinforcement zone constituted by the two disjoint sectors provides several advantages.

Firstly, the compromise between flexibility and ability to withstand compression and impact for the cable is optimized, given the other constraints that need to be satisfied such as bending at low and high temperature, cyclical flexing, or indeed twisting of the cable.

In addition, access to the optical fibers housed in the internal bore of the cable is direct, passing through the tube between two disjoint sectors of the reinforcement zone. In this second embodiment, it is particularly easy to connect the cable to one or more branch cables by making a mid-span access. In addition, no special tools are required to open the cable, where special tools would have increased installation costs. A simple blade suffices to open the cable with the disjoint sectors disposed on either side of the internal bore serving to guide progress of the cutting tool, thereby protecting the fibers against the risk of being damaged.

In a first variant as shown in FIG. 2 the cable is constituted by a single tube 1 defining an internal bore 3 housing at least one optical fiber 5, and the wall of the tube includes a reinforcement zone made up of two disjoint sectors 72A and 72B each of which in a cross-section plane is in the form of a substantially annular half-cylinder. Reinforcing elements 9 are disposed in a regularly spaced-apart configuration in the two sectors 72A and 72B.

FIGS. 3 and 4 show two other variants of a cable reinforcement zone made up of two disjoint sectors. In particular, FIG. 3 has sectors each of which in a cross-section plane is in the form of a substantially elliptical half-cylinder, while in FIG. 4 each is in the form of a substantially crescent-shaped half-cylinder.

The cable of the invention can be manufactured, for example, by co-extrusion of the tube and of the reinforcement zone. Extruder heads of different shapes make it possible to obtain a reinforcement zone that is continuous and annular, or in the form of two sectors, as described above. Reinforcing elements are inserted simultaneously via the extruder head selected as a function of the desired reinforcement zone, which is caused to rotate about an axis parallel to a generator line of the extruded cable so as to impart helical orientation to the continuous annular reinforcement zone in the direction of the generator line of the cable.

The cable of the invention can thus be manufactured in a single stage, thereby making it possible to increase the speed of the manufacturing line and to reduce production costs.

We claim:

1. An optical fiber cable comprising:
   a single tube defining an internal bore including
      a wall; and
      a reinforcement zone incorporated in said wall so that said wall comprises two layers separated by said reinforcement zone, said reinforcement zone including a plurality of reinforcing element;
   at least one optical fiber housed in said tube; wherein the reinforcement zone is constituted by a thermoplastic material giving the cable both flexibility and resistance against compression and impact.

2. A cable according to claim 1, in which the tube is constituted by a thermoplastic material which possess a bending modulus greater than 850 MPa and the reinforcement zone possesses a bending modulus greater than 1000 MPa.

3. A cable according to claim 1, in which additives are inserted into the material constituting the tube to give the cable resistance against heat and aging.

4. A cable according to claim 1, in which fillers are inserted into the material constituting the reinforcement zone to give the cable increased resistance against compression and impact.

5. A cable according to claim 1, in which the reinforcement zone has, in a cross-section plane of the cable, a section in the form of a continuous annulus and is surrounded by two layers of the tube.

6. A cable according to claim 1, in which the reinforcement zone possesses helical orientation in a direction parallel to a generator line of the cable.

7. An optical fiber cable comprising:
   a single tube defining an internal bore including
      a wall; and
      a reinforcement zone incorporated in said wall so that said wall comprises two layers separated by said reinforcement zone, said reinforcement zone including a plurality of reinforcing elements extending parallel to a generator line of the cable to give traction strength to the cable; and
   at least one optical fiber housed in said tube, wherein the reinforcement zone is constituted by a thermoplastic material giving the cable both flexibility and resistance against compression and impact.

8. An optical fiber cable comprising:
   a single tube defining an internal bore including
      a wall; and
      a reinforcement zone incorporated in said wall so that said wall comprises two layers separated by said reinforcement zone, said reinforcement zone including, in a cross-section plane of the cable, at least two disjoint sectors disposed on opposite sides of the bore of the cable; and
   at least one optical fiber housed in said tube, wherein the reinforcement zone is constituted by a thermoplastic material giving the cable both flexibility and resistance against compression and impact.

9. A cable according to claim 8, in which each sector is in the form of a substantially annular semi-cylinder.

10. A cable according to claim 8, in which each sector is in the form of a substantially elliptical semi-cylinder.

11. A cable according to claim 8, in which each sector is in the form of a substantially crescent-shaped semi-cylinder.

* * * * *